J. P. SKRIPEC.
MOTOR PLOW.
APPLICATION FILED JUNE 8, 1912.
1,105,214.
Patented July 28, 1914.
3 SHEETS—SHEET 3.
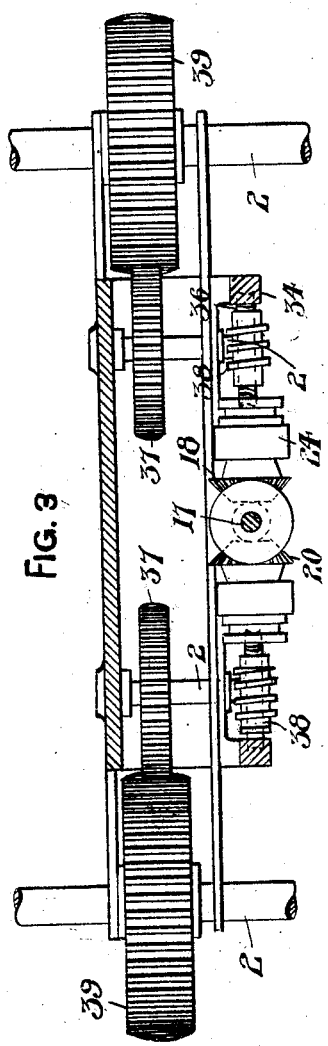
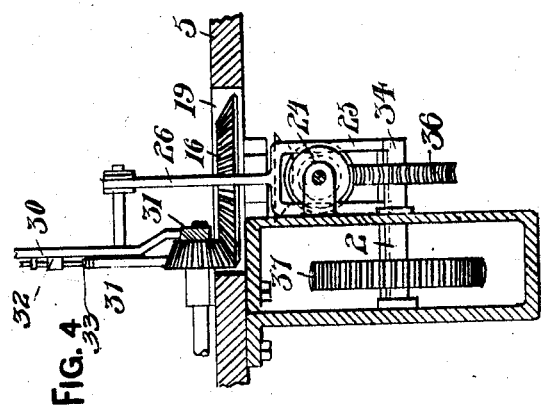
WITNESSES
INVENTOR
J. P. Skripec
BY
ATTORNEYS

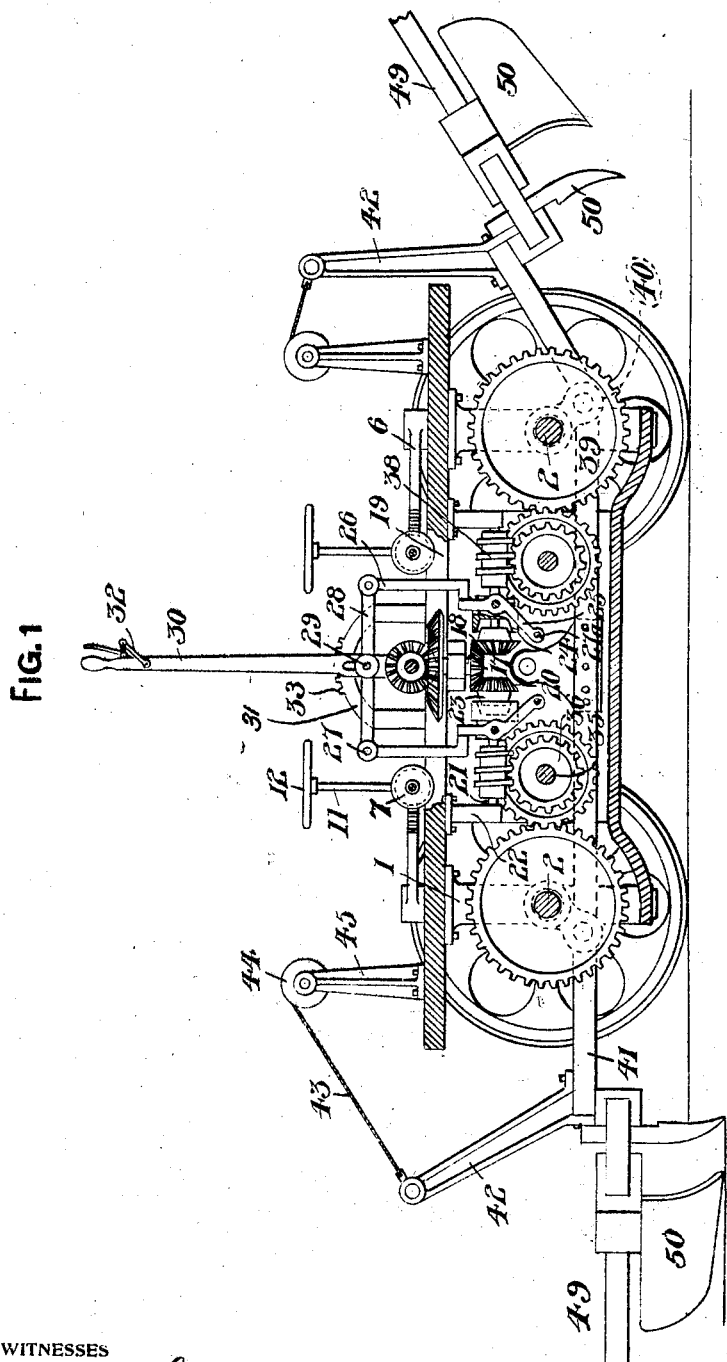

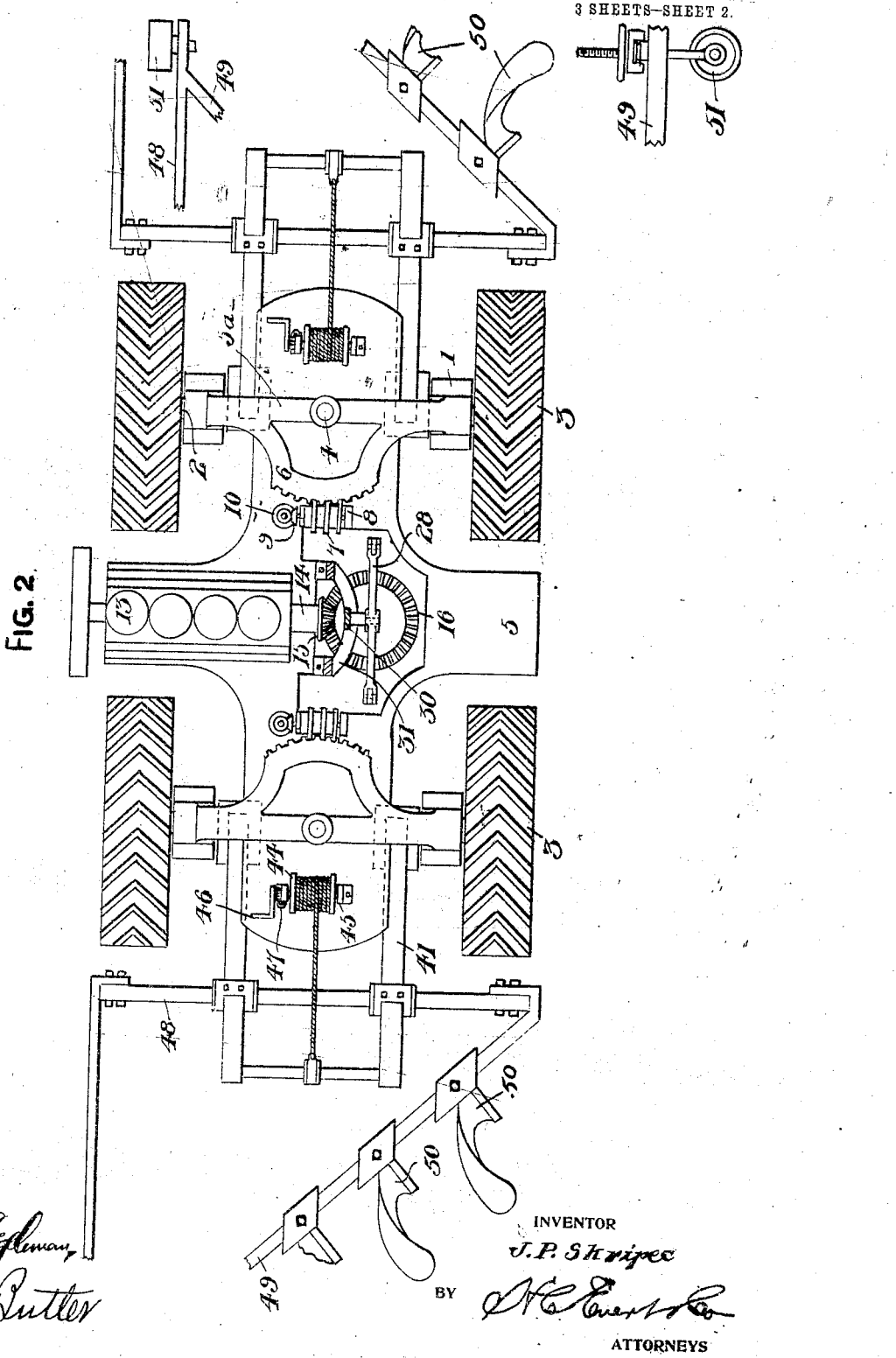

UNITED STATES PATENT OFFICE.

JOHN PETER SKRIPEC, OF CINCINNATI, OHIO.

MOTOR-PLOW.

1,105,214.   Specification of Letters Patent.   Patented July 28, 1914.

Application filed June 3, 1912. Serial No. 700,895.

*To all whom it may concern:*

Be it known that I, JOHN PETER SKRIPEC, a subject of the Emperor of Austria-Hungary, residing at Cincinnati, in the county of Hamilton and State of Ohio, have invented certain new and useful Improvements in Motor-Plows, of which the following is a specification, reference being had therein to the accompanying drawing.

This invention relates to motor plows, and the primary object of my invention is to provide a motor driven plow that can be easily operated to expeditiously and economically till the soil, particularly on large level farms as found in Western States.

Another object of this invention is to provide an operating mechanism for controlling the movement of a plow in either direction, a steering mechanism for guiding a plow and an elevating mechanism for moving the plow shares as occasion may demand.

A further object of this invention is to accomplish the above result by a compact agricultural implement that is durable and highly efficient for the purpose for which it is intended.

With the above and other objects in view the invention resides in the novel construction, combination and arrangement of parts to be hereinafter specifically described and then claimed.

Reference will now be had to the drawings, wherein like numerals denote corresponding parts throughout the several views, in which—

Figure 1 is a longitudinal sectional view of the plow, Fig. 2 is a plan of the same, Fig. 3 is a horizontal sectional view of the operating mechanism of the plow, and Fig. 4 is a cross sectional view of the same.

A plow in accordance with this invention comprises bolsters or trucks 1 that support revoluble axles 2. Mounted upon the ends of the axles 2 are wheels 3 that have wide treads whereby the motor plow can be easily moved over unbroken or irregular ground.

The bolsters or trucks 1 are provided with king bolts 4 and arranged upon the trucks or bolsters is a platform 5 that has openings providing clearance for the king bolts. Mounted upon the king bolts 4 are frames 5ª that are carried by the trucks or bolsters 1. The frames 5ª are provided with segment racks 6 and meshing with these racks are worms 7 revolubly supported by bearings 8, carried by the platform 5. The worms 7 have beveled gear wheels 9 meshing with beveled gear wheels 10, carried by the lower ends of vertical shafts 11 supported by the platform 5. The upper ends of the shafts 11 are provided with hand wheels 12 and the operator of the motor plow can manipulate either one of the wheels to drive the motor plow.

Arranged upon the platform 5, at one side thereof, is a motor 13, which has been illustrated in the form of an internal combustion engine. The driven shaft 14 of the motor is provided with a small beveled gear wheel 15 meshing with a large horizontal beveled gear wheel 16, mounted upon a vertical shaft 17, journaled in a bearing 18, supported by the platform 5. The platform 5 is provided with an opening, said opening providing clearance for the beveled gear wheels 15 and 16, together with other operating mechanism to be hereinafter specifically described. The beveled gear wheel 17 meshes with beveled gear wheels 20 mounted upon the inner ends of shafts 21 that are journaled in hangers 22, carried by the underneath side of the platform 5. The beveled gear wheels 20 have clutch members 23 and adapted to engage these clutch members are clutch shoes 24 that are slidably mounted upon the shafts 21, and arranged to rotate therewith. Loosely connected to the clutch shoes 24 are arms 25 of yokes 26, said yokes extending upwardly through the opening 19 of the platform. The upper ends of the yokes are pivotally connected, as at 27 to a bar 28 and said bar is loosely connected, as at 29 to an operating lever 30. The operating lever 30 is pivotally supported by a bracket 31 that extends over the beveled gear wheel 16. The operating lever 30 has a locking mechanism 32 adapted to engage a rack 33, carried by the platform 5, clearly shown in Fig. 4, whereby the operating lever 30 can be locked in an adjusted position with either of the clutch shoes 24 engaging one of the clutch members 23. The lower ends of the yoke 26 are pivotally supported upon rods 27ª, carried by the side walls of a casing 34. Journaled in the side walls of the casing 34 are transverse shafts 35 and mounted upon said shafts are small gear wheels 36 and large gear wheels 37. The small gear wheels 36 mesh with worms 38 mounted upon the shafts 21, and the large gear wheels 37 mesh with large gear wheels 39 mounted upon the revoluble axles 2.

The axles 2, at the inner sides of the trucks or bolsters 1, are provided with loose links 40 and pivotally connected to said links are frames 41. The frames 41 are provided with angularly disposed arms 42 and connected to said arms are cables 43. The cables 43 are attached to and wound upon drums 44 revolubly held by bearings 45, carried by the ends of the platform 5. The drums 44 have cranks 46 whereby said drums can be revolved to wind the cables 43 thereon, and associated with the cranks 46 are ratchets and pawls 47 of the ordinary and well known type that are employed for holding the drums 44 against rotation in one direction. The frames 41 support triangularly-shaped plow frames 48 and arranged upon the beam 49 of each plow frame are a plurality of adjustable plow shares 50. The plow shares 50 can be suitably spaced apart upon the beam 49, and the ends of the plow frame have trailer wheels 51 for supporting said plow frame when the plow shares 50 are in use.

In operation, the motor 13 is controlled by the operator of the machine, and assuming that conditions are ripe for operation, the operator controls the movement of the machine through the medium of the lever 30. By shifting the lever 30 in one direction, a rotary movement is imparted by the motor 13 through the medium of the elements 14, 15, 16, 17, 18, 38, 36, 37 and 39. As the motor plow is moved, the operator can control the direction of the same through the medium of the elements 1, 5ª, 6 to 12 inclusive. When the plow shares 50 are not in use, they are retained in an elevated position, as shown at the right hand side of Fig. 1, and when in use, the plow shares are lowered as shown at the left hand side of Fig. 1, the depth of the plow shares in the soil being determined by the position of the plow frame 48.

With the motor plow movable in either direction, the machine can be expeditiously and economically operated and as the same is compact, it will occupy comparatively small space when not in use and when in storage.

While in the drawings there is illustrated a preferred embodiment of the invention, it is to be understood that the structural elements are susceptible to such changes, in the size, shape and manner of assemblage as fall within the scope of the appended claim.

What I claim is:—

A motor plow comprising trucks, a platform supported thereby and provided with a centrally disposed opening, front and rear axles carried by the trucks and provided with traction wheels, gear wheels carried by the axles below the platform, a casing supported from said platform central thereof, transverse shafts journaled in and projecting from said casing, said shafts arranged at the ends of the casing and each being provided with small and large gear wheels, said large gear wheels arranged within said casing and meshing with the gear wheels on the axles, hangers carried by said casing, brackets supported by said casing, oppositely disposed longitudinally extending shafts journaled in said brackets and hangers, and provided with worms meshing with said small gear wheels, a motor carried by said platform, a driving mechanism within and depending from said opening and extending between said longitudinal shafts, an operative connection between the driving mechanism and said motor, and a clutching mechanism and said motor, and a clutching mechanism extending through said opening for operatively connecting said driving mechanism with one or the other of said longitudinal shafts.

In testimony whereof I affix my signature in the presence of two witnesses.

JOHN PETER SKRIPEC.

Witnesses:
ERNEST MACKSTALLER,
LOUIS FAMBRY.